United States Patent

Böhm et al.

[11] Patent Number: 5,258,603
[45] Date of Patent: Nov. 2, 1993

[54] MAGNETIC READING HEAD HAVING A TAPERED READING OPENING AND/OR A TAPERED READING STYLUS

[75] Inventors: Alfred Böhm, Viechtach; Wilhelm Binder, Tiefenbach, both of Fed. Rep. of Germany

[73] Assignee: Ultrakust Electronic GmbH, Ruhnannsfelden, Fed. Rep. of Germany

[21] Appl. No.: 726,190

[22] Filed: Jul. 5, 1991

[30] Foreign Application Priority Data

Jul. 4, 1990 [DE] Fed. Rep. of Germany ....... 4021241

[51] Int. Cl.$^5$ ............................................. G06K 7/08
[52] U.S. Cl. .................................. 235/449; 235/450; 360/117; 360/2
[58] Field of Search ...................... 235/449, 450, 493; 360/2, 110, 117; 382/64

[56] References Cited

U.S. PATENT DOCUMENTS

| | | | |
|---|---|---|---|
| 3,710,362 | 1/1973 | Manzo et al. | 360/117 |
| 3,723,669 | 3/1973 | Bose et al. | 360/117 |
| 4,291,351 | 9/1981 | Pennell et al. | 360/113 |

FOREIGN PATENT DOCUMENTS

| | | | |
|---|---|---|---|
| 0390405 | 10/1990 | European Pat. Off. | 235/449 |
| 2705439 | 8/1977 | Fed. Rep. of Germany. | |
| 2645878 | 4/1978 | Fed. Rep. of Germany. | |
| 0168282 | 12/1981 | Japan | 235/449 |

OTHER PUBLICATIONS

Hall-effect magnetic sensor, Electronics, Feb. 1, 1973, pp. 91-96.

Primary Examiner—Donald T. Hajec
Assistant Examiner—Esther Chin
Attorney, Agent, or Firm—Keck, Mahin & Cate

[57] ABSTRACT

The invention concerns a reading head with a tapered reading opening and/or a tapered reading stylus for reading bar-type, especially passive magnetic information on a data carrier. A high resolution in reading this information with a high output signal is obtained by tapering the reading opening in direction of the end face of the reading head. The reading head is located in a casing pot and has at least one field plate sensor, on which side remote from the face a permanent magnet is placed with a magnetic shunt to the casing pot.

17 Claims, 5 Drawing Sheets

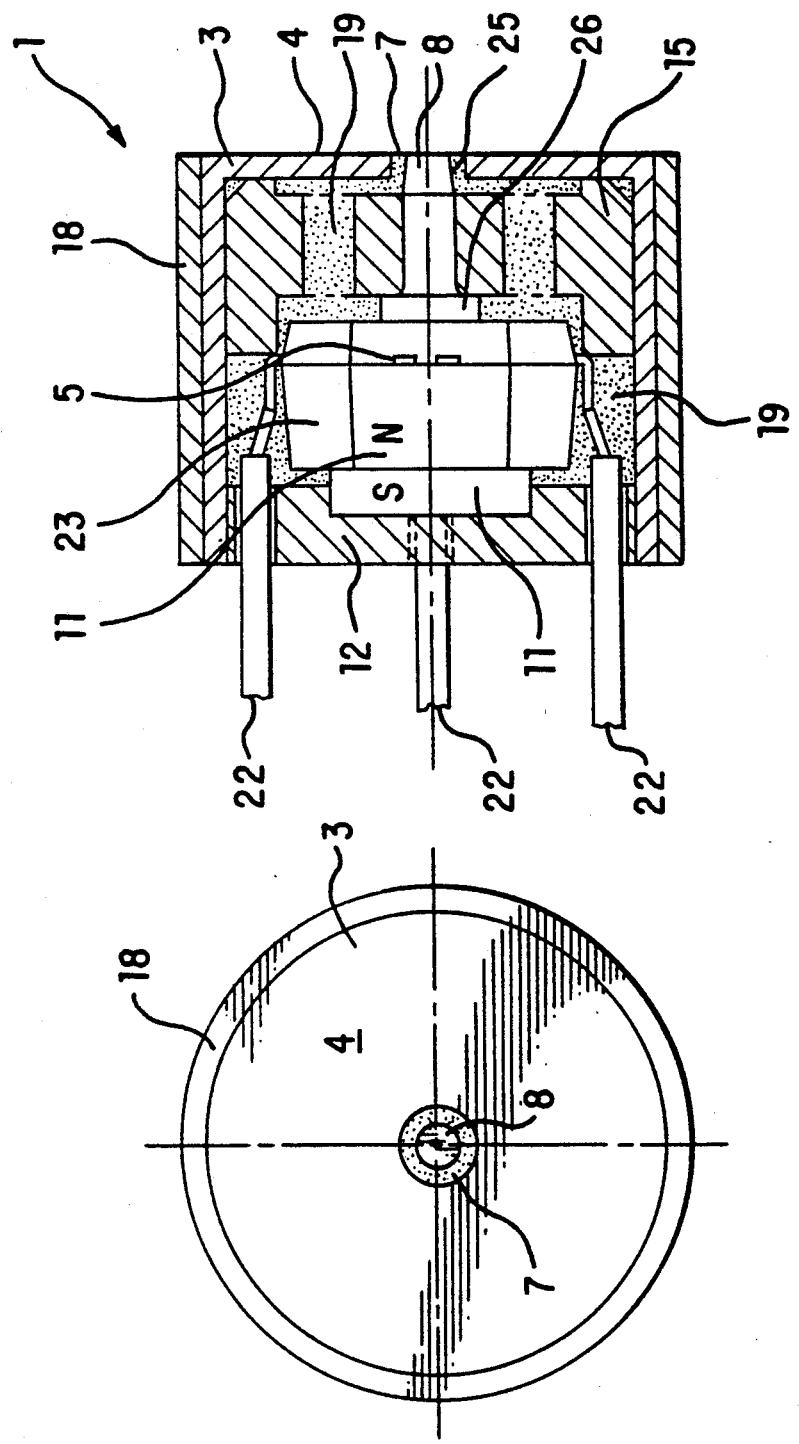

MAGNETIC READING HEAD HAVING A TAPERED READING OPENING AND/OR A TAPERED READING STYLUS

The invention relates to a reading head for reading bar-type, especially passive magnetic information on a data carrier.

A data carrier of this type is e.g. described in DE 26 45 878 C2 and has on either side two coding tracks, whereof one is the information or code track and the other the synchronization or clock track. Both tracks comprise individual elongated bars, whose reciprocal spacing is roughly the same as their width. These bars are magnetically conductive or non-conductive, so that the information stored thereon can be read by a reading head moved past at right angles to the bars.

The known reading heads use field plate sensors. In order to ensure a reliable scanning and reading of the information, the reading head is moved past very close to the coded bars, but this leads to a relatively high wear or scratching level. This disadvantage leads to the field plates assuming undefinable basic resistance values, which leads to reading errors.

In addition, the physical and geometrical construction of the reading head is so large that if it is inclined slightly with respect to the orientation of the coding bars of the field plate sensor two or three magnetic codes of adjacent bars are covered. This leads to angle-dependent evaluation signals, because the code of an individual bar can no longer be accurately determined. In order to be able to eliminate such errors, complicated evaluation circuitry is required, which cannot be used in the case of relatively inexpensive mass-produced products.

DE 27 05 439 C2 discloses a reading head, which has a circular cylindrical reading opening and which is consequently not susceptible to angular deviations of the desired angle of the reading head relative to the data carrier.

However, the use of this reading head is restricted in that it is only suitable for reading actively magnetized information carriers. However, the latter are susceptible to the action of magnetic interference fields. In the case of the information carrier they can lead to the loss of the stored information.

DESCRIPTION OF THE INVENTION

The object of the invention is to improve a reading head of the aforementioned type, that it allows a good signal evaluation or processing with high resolution, which is very robust and permits an angle-independent guidance with respect to more particularly passively magnetized coding bars.

In the case of the aforementioned reading head this object is achieved by the features of claim 1. Further advantageous developments can be gathered from the subclaims.

The magnetic flux is focussed by the inventive tapering of the reading opening, whereby a relatively high output signal is obtained by magnetic coupling of the field plate sensor with the casing pot via a permanent magnet. The reading head enables the reading of information which is solely comprised in the magnetic resistance of the information carrier.

In an embodiment of the invention the field plate sensor is set back somewhat from the end face, so that it is removed from the area subject to wear. However, in order to achieve a high sensitivity with respect to resistance changes in the field plate, between the very small reading opening, which is only slightly larger than the width of a coding bar, is coupled a magnetically conductive guide stylus or pencil, which can be looked upon as a centring or focussing pencil. By means of the latter the fictional circumferential surface of the field plate sensor is focussed and concentrated towards the end face, i.e. the scanning side. Thus, towards the end face the sensor surface is so to speak reduced in size, but this makes it possible to adapt to the coding bar width.

In addition to these measures and the spaced arrangement of the field plate sensor relative to the face, the entire field plate sensor is encapsulated into a magnetically conductive casing pot. The latter only leaves a small reading opening free on the end face and the face of the guide stylus is located in its centre axis.

The distance between the guide stylus and the marginal area of the reading opening in the casing pot is kept such that if a coding bar is located precisely in front of the reading opening a detectable resistance change occurs due to the modified, magnetic flux and the latter is to be considered in comparison with the uninterrupted magnetic flux when said coding bar is absent. The guide stylus advantageously has a T, ram or mushroom shape and preference is given to a gradual tapering towards the reading opening and in the casing area it points in frustum-like manner towards the face. On the field plate sensor side a widening takes place, so as to at least cover the entire surface of the field plate sensor. On the side remote relative to the reading opening the field plate sensor is magnetically connected to a magnet, specifically a permanent magnet. The latter is connected to the magnetically conductive bottom of the casing pot, so that through the limited magnetic resistance, a high sensitivity is also achieved in the vicinity of the reading opening.

For manufacturing reasons the casing pot is in cross-section roughly U-shaped and rotationally symmetrical, the reading opening being located in the axis of symmetry. On the opposite side to the reading opening the casing pot is terminated with a magnetically conductive bottom or a material plate, which leads to an enclosed casing.

With a view to a high sensitivity the entire reading head with its components is centred by means of centring devices on the median longitudinal axis passing through the centre of the reading opening. This centring more particularly applies to the guide stylus, the field plate sensor and the reading opening.

The individual reading head components located within the casing pot are designed in such a way that the sensor unit can easily be sealed with a sealing compound, which is not magnetically conductive. This measure leads to high thermal stability, whilst also providing protection against moisture and giving insensitivity to vibrations.

In order to be able to design the reading head in angle-independent manner, i.e. to avoid influences caused by the inclining or sloping of the complete scanning means compared with the vertical position with respect to the coding bars, the reading opening diameter is such compared with the frontal diameter of the guide stylus that the diameter of the latter roughly corresponds to the width of a coding bar. This excludes magnetic influences through adjacent coding bars in the face of the reading head and these can have no influence on the scanning of the centring member. The reading head is consequently made angle-independent and rotationally symmetrical, which largely prevents errors by the person operating the reading head.

For the evaluation of the magnetic coding in the case of this reading head design, a curve shape of the resistance change in the field plate sensor is obtained, which is virtually of an optimum nature and angle-independent and time-uncritical. Particular preference is given to an electronic circuit connected in series with the field plate sensor and which provides a square-wave pulse per magnetic conductive bar, preferably as an open collector output. This pulse characteristic also leads to a simplification of the conversion into a digital output signal.

In the case of a code and a synchronization track it is appropriate for the probe equipped with two reading heads to be constructed in interchange-proof manner with respect to the association of the code track with a specific reading head. This appropriately takes place with an asymmetrical design of the reading head adapting e.g. to different widths of the data carrier or number block, as in DE-26 45 878 C2.

With regards to the evaluation of the information read, it is also conceivable for the electronic evaluating circuit to recognize the code and clock track solely on the basis of the information sequence. For example the code track could be provided with an extra coding bar, so that in this case a magnetic "0" would be read for the clock track.

Despite setting back the field plate sensor into the casing pot, it would appear appropriate to also monitor the internal resistance of the said sensor, so that on achieving, e.g. a critical threshold, which indicates a malfunction, a blocking of the reading head is indicated visually or acoustically, so that the user is made aware of the inoperative state.

DESCRIPTION OF THE DRAWINGS

The invention is described in greater detail hereinafter relative to an embodiment and the attached drawings, wherein show:

FIG. 2 A section like FIG. 1, but with further details concerning the internal components of the reading head.

FIG. 3 A view of the end face of a reading head according to FIG. 2.

FIG. 1 shows a reading head 1 in axial section with its essential components. The reading head has an outer, magnetically conductive casing pot 3, which has an approximate U-shape and frontally has a reading opening 7 coaxial to its median longitudinal axis. On the side remote from the end face 4 the casing pot 3 is terminated with a magnetically conductive base plate or a corresponding conductive material. As internal components the reading head 1 has the field plate sensor 5 set back inwards from the end face. The field plate sensor 5 is magnetically connected to the reading opening by means of a mushroon-shaped guide pencil or stylus 8. The field plate sensor 5 and guide stylus 8 for precise orientation on the longitudinal axis of the reading head are arranged by means of a standard rotationally symmetrical centring body 15 in the casing pot.

Figure 1:
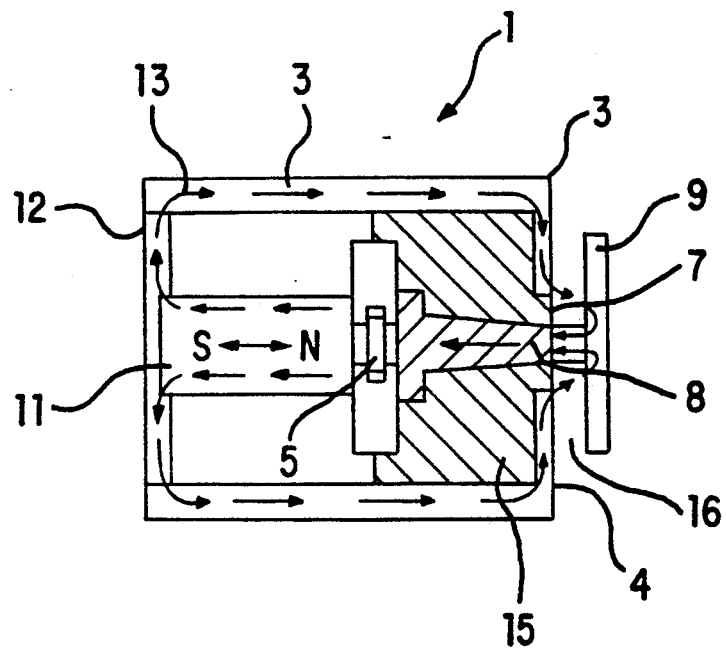
FIG. 1 An axial section through the diagrammatic construction of a reading head with a coding bar in the vicinity of the end face.

On the back of the field plate sensor 5 is provided a magnet, particularly a permanent magnet 11, which produces a magnetic shunt between the bottom side of the field plate sensor 5 and the base 12 of the casing pot 3. On referring to the sectional representation according to FIG. 2, which more accurately shows the design of the reading head 1 diagrammatically represented in FIG. 1, it is clear that the face of the centring or guide stylus 8 terminates in flush manner with the end face 4 of the casing pot 3. In the case of a coaxial construction of the type shown between the end face of the guide stylus 8 and the edge of the reading opening there is a relatively small, magnetically insulating gap, which is normally filled with sealing compound 19. The gap width is inter alia adaptable to the data carrier and the sensitivity, which is necessary for an error-free reading out of the coding information.

As shown in FIG. 1 in the represented case where a coding bar 9 comes very close to the face 4 of the reading head 3, the magnetic field lines 13 are passed over said coding bar 9, in the sense of bridging the reading opening 7, to the end face of the guide stylus 8. The magnetic resistance of the overall circuit is much smaller in this case, so that the resistance change, which is dependent on the magnetization of different coding bars 9, can be evaluated in a not shown, series-connected electronic circuit as read information.

The diagrammatic representation of FIG. 1 shows that the T, ram or mushroom-shaped guide stylus is constructed so as to concentrate or taper towards the reading opening, whilst it is contacted on the field plate sensor in the manner of a mounting socket 26 (FIG. 2). This contact circuit 26 ensures a widening over the magnetic field lines, so that they can be detected over the entire circumference of the field plate sensor 5.

Supplementing FIG. 1, FIG. 2 shows the centring body 15, which is so constructed that an encapsulation of the components of the field plate sensor, the guide stylus 8, the centring member 15 and the magnet 11, including a receptacle 23 for said sensor 5, can take place with sealing compound 19 from the rear side. The orientation of these components is strictly axially symmetrical or coaxial to the median longitudinal axis. The centring member 15 advantageously has an insertion opening for the guide stylus 8 and, considered inwards, a fitting opening for the field plate sensor 5. The centring member 15 is appropriately oriented on the inner faces of the casing pot and has both in the frontal region towards the reading opening 7 and also in axially parallel manner openings, so that the hardening and component-stabilizing sealing compound can be introduced in one production step.

In order to bring about a further improvement, the furthest forward area of the guide stylus 8 is designed with its conical, frustum-shaped end towards the face 4. As a result of this shaping it is possible to constructionally very easily modify the magnetically insulating gap between the reading opening and the guide stylus. For the same casing pot geometry, this only requires a further chamfering at the front end of the guid stylus.

A permanent magnet, in the present case with its north pole directed against the field plate sensor 5 is arranged in the rear area of the latter, whilst the south pole projects into the plate-like bottom termination 12, which is magnetically conductive. Obviously electrical connections or terminals 22 are passed through said base plate 12. On the radial circumferential side the casing pot 3 is e.g. provided with a jacket 18, which generally ensures an electrical shielding.

Figure 9:
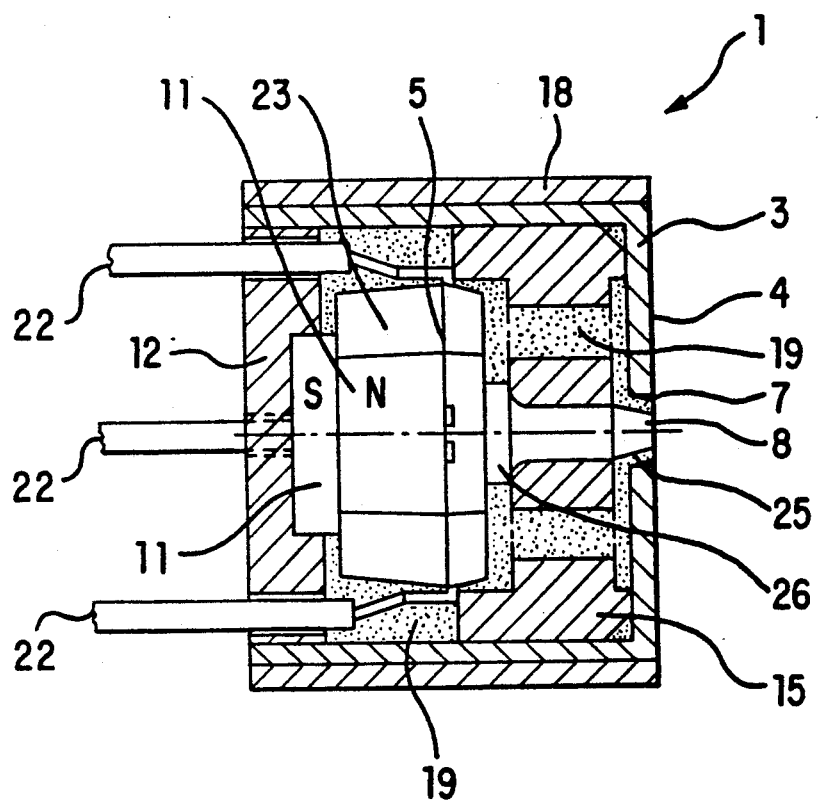
FIG. 9 is a section similar to FIG. 2, showing a tapered reading opening.

FIG. 9 is similar to FIG. 2, and shows a tapered reading opening 7 in which a guide stylus 8 is present.

FIG. 3 is a view of the face of the rotationally symmetrical reading head 1 and the same reference numerals indicate the same subassemblies as herein-before.

Figure 4:
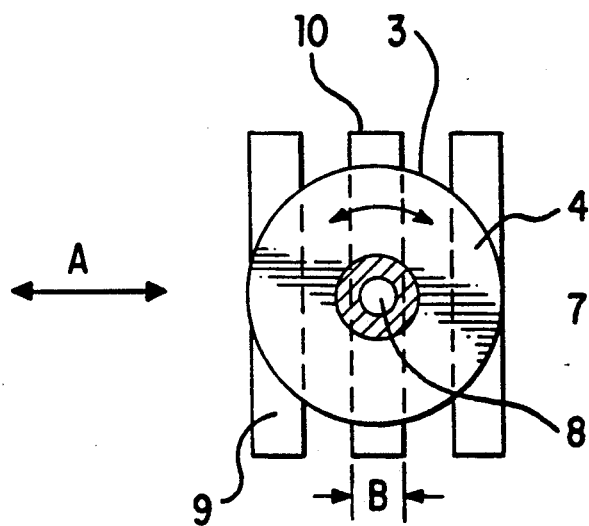
FIG. 4 A diagrammatic representation of the size ratios of the end face of the reading head and the reading opening, including the guide stylus, compared with three coding bars.

FIG. 4 is a basic representation of the reading function. The reading head 1 is normally moved perpendicularly to the adjacent coding bars 9 by a geometrical design of the data carrier and the probe having the reading head or several reading heads. The front face of the centring bar 10 is designed in such a way that its diameter roughly corresponds to the width B of a coding bar 9, which is made from a magnetically conductive material, e.g. as a soft magnet.

The diameter of the reading opening 7 is somewhat larger than the width of the coding bar 9. Thus, the magnetic flux of the just scanned or read coding bars 9 is passed in centring manner into the guide stylus 8, whilst interference fields of adjacent coding bars are magnetically short-circuited by the face 4 of the reading head 3. Thus, the reading head 1 can be looked upon as having a rotationally symmetrical construction, so that the information content is also not influenced by a different angular inclination during scanning, as indicated by an arrow A.

Figure 5:
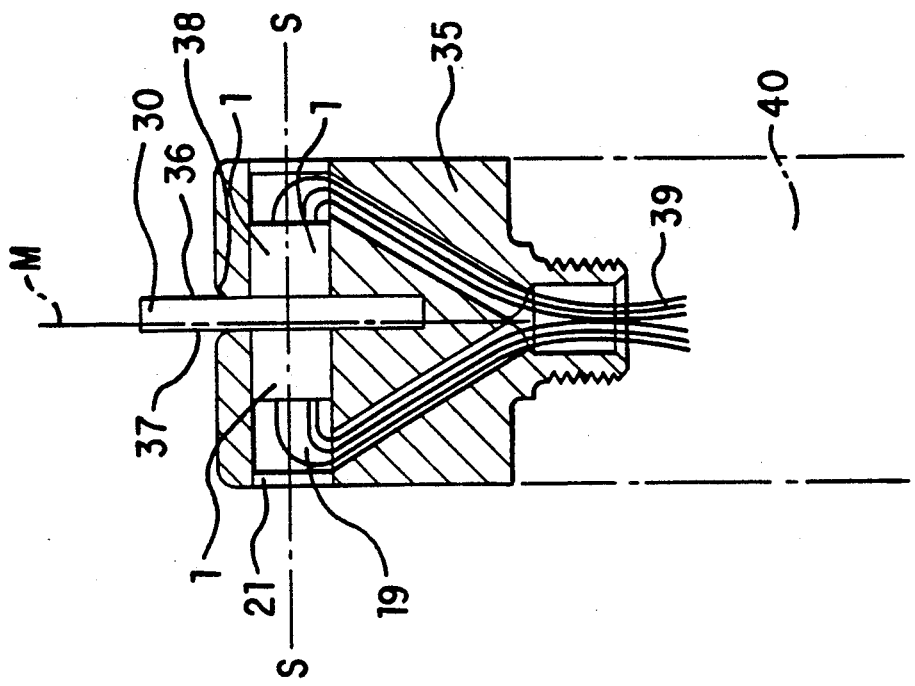
FIG. 5 An axial sectional representation through a probe with two reading heads arranged so as to face one another in axially symmetrical manner and between which is placed a plate-like data carrier.

FIG. 5 shows the cooperation between two reading heads 1 in a probe 35, which face one another and are oriented in the axis of symmetry S in the form of a section along the centre axis M. The reading heads 1 are spaced by a gap, which in accurately fitting manner corresponds to the width of a disk or wafer-like data carrier 30. The latter has on the left-hand side a code track 37 and on the right-hand side a clock track 36 in the form of a coding bar 9. Thus, in the present case this coding bar is parallel to the centre axis M or in the lateral faces of the data carrier 30. The spacing gap 38 between the two reading heads 1 is slightly displaced to the right. In other words the width at right angles to the centre axis M of the left-hand area is somewhat larger than the width of the probe 35 in the right-hand area. This ensures that it is not possible to incorrectly insert the probe on reading the data carrier 30. It is pointed out in this connection that the probe is guided in accurately fitting manner even in lateral guides, e.g. of a number block according to DE 26 45 878 C2, so that there is only one orientation possibility between the probe and the data carrier 30. This ensures that the left-hand reading head 1 always scans the code track, whilst the right-hand reading head only reads the clock track 36.

In the example of FIG. 5, the reading heads 1 are received in bores in the probe 35 and which are closed at the rear by a sealing compound 19 and a terminating plate 28. Roughly in the vicinity of the centre axis M, corresponding lines 39 are led rearwards in a handle 40, which receives the evaluation electronics.

Figure 6:
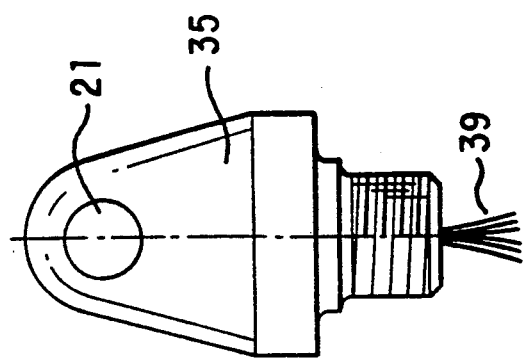
FIG. 6 A side view of the probe according to FIG. 5, without the data carrier.

FIG. 6 is a view of the side of the probe 35 according to FIG. 5. The probe is rounded in the front region, which permits an easy, reliable movement along the data carrier.

Thus, the invention permits a reliable, error-free reading of the code information, avoiding interference by adjacent codes. In addition, deterioration due to abrasion on the field plate sensor is eliminated and in spite of this there is an optimum sensitivity as a result of the centring possibility by means of a guide stylus. The reading head is made vibrationally stable due to the sealing compound introduced, whilst temperature changes and moisture lead to no noticeable influences on the reading accuracy.

Thus, a forward and reverse movement of the stored information is possible at any time with this design of the reading head and the corresponding data carrier.

Figure 7:
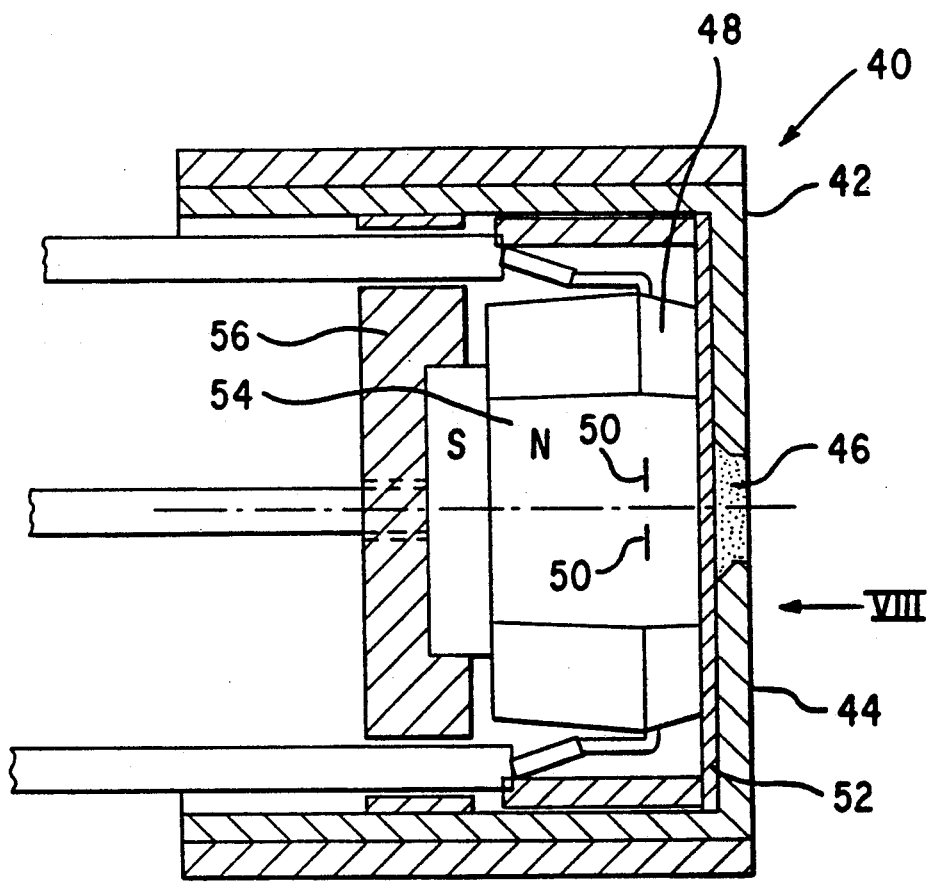
FIG. 7 An axial section through a reading head without a guide stylus.

The reading head 40 shown in FIG. 7 has a magnetically conductive casing pot 42 with a circular reading opening 46. The end face 44 of the casing pot 42 lies adjacent to the data carrier. The reading opening 46 is tapered towards the end face 44 and is sealed with a magnetically non-conductive material, for example hard solder. The carrier 48 for the field plate 50 is separated from the reading opening 46 by a plastic foil 52. The plastic foil 52 shall damp mechanical beats on the end face 44 of the casing pot 42 to save the field plates 50. The field plates 50 are connected magnetically conducting with the casing pot 42 by a permanent magnet 54 and the casing bottom 56 for obtaining a high output signal. By the tapering of the circular reading opening 46 a sharply defined focussing of the magnetic flux is obtained which enables a high resolution in reading an information of a data carrier which is coded in the magnetical resistance of the information carrier on the data carrier.

Figure 8:
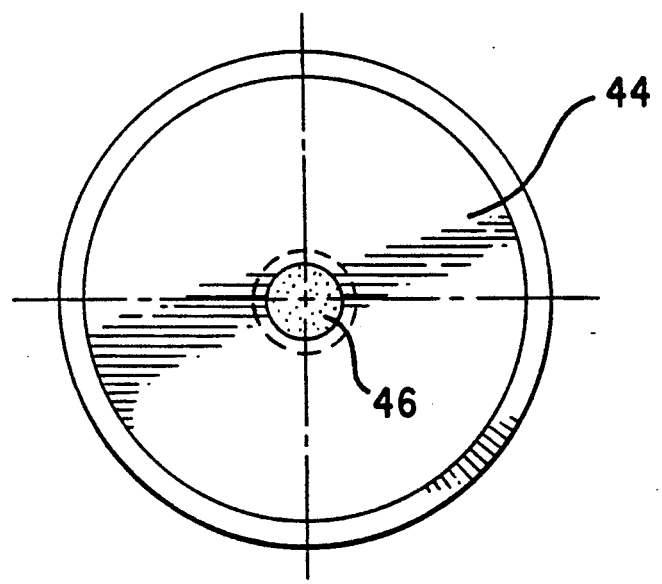
FIG. 8 a view VIII on the end face of the reading head in FIG. 7.

FIG. 8 shows a view on the end face 44 of the reading head 40 with the circular reading opening or reading gap 46 which is sealed by a silver hard solder. The interrupted circular line shows the inner diameter of the circular reading opening 46.

We claim:

1. A reading head for reading a bar-type magnetic information on a data carrier, wherein the reading head has a reading opening which is tapered towards an end face of the reading head, the reading head being located in a casing pot and having at least one field plate sensor, and wherein a permanent magnet is placed on the field plate sensor on a side remote from said end face with a magnetic shunt to said casing pot.

2. A reading head according to claim 1, wherein a magnetically conductive guide stylus frontally projects into the reading opening, and wherein the guide stylus is magnetically insulated with respect to the casing pot and is contacted flat with the field plate sensor on the side remote from said end face.

3. A reading head according to claim 2, wherein the guide stylus and the field plate sensor have a frontal surface facing the data carrier, the frontal surface of the guide stylus being smaller than the frontal surface of the field plate sensor.

4. A reading head according to claim 2, wherein the guide stylus is T, mushroom or ram-shaped.

5. A reading head according to claim 2, wherein the guide stylus has a frontal surface, whose diameter roughly corresponds to the width of the bar-type magnetic information on the data carrier.

6. A reading head according to claim 2, wherein the casing pot receives in magnetically encapsulated manner the field plate sensor and wherein the diameter of the frontal reading opening is slightly larger than the diameter of the guide stylus in the plane of the frontal reading opening.

7. A reading head according to claim 2, wherein the casing pot receives the field plate sensor in magnetically encapsulated manner and wherein the width of the frontal reading opening is slightly larger than the frontal width of the guide stylus.

8. A reading head according to claim 2, wherein the guide stylus is tapered, particularly in frustum-shaped manner towards the end face in the vicinity of the reading opening.

9. A reading head according to claim 1, wherein the casing pot is U-shaped in cross-section and has a front surface forming a planar end with the reading opening and wherein on the side remote from the end is provided a magnetically conductive material in contact with the permanent magnet and the casing pot.

10. A reading head according to claim 2, wherein the casing pot, guide stylus and permanent magnet are positioned coaxially to the centre axis of the field plate sensor.

11. A reading head according to claim 1, wherein the field plate sensor is coaxially arranged in the casing pot by means of a centring device and is sealed with a magnetically insulating sealing compound.

12. A reading head according to claim 2, wherein the guide stylus is fixed and wherein the relative movement between the bar-type magnetic information on the data carrier and the fixed guide stylus takes place substantially perpendicular to adjacent bar codes.

13. A reading head according to claim 2, wherein the guide stylus has a frontal surface, which is angle-independent relative to the magnetic information on the data carrier.

14. A reading head according to claim 1, wherein the reading opening is sealed with magnetically non-conductive material.

15. A reading head according to claim 14, wherein the reading opening is sealed with a hard solder.

16. A reading head according to claim 15, wherein a layer for a mechanical damping is provided between the field plate and the reading opening.

17. A reading head for reading bar-type magnetic information on a disk or web-like data carrier with magnetic information on two sides, wherein the reading head has a reading opening which is tapered towards an end face of the reading head, the reading head being located in a casing pot and having at least one field plate sensor, and wherein a permanent magnet is placed on the field plate sensor on a side remote from said end face with a magnetic shunt to said casing pot, wherein two frontally facing casing pots with an axially symmetrical orientation of their reading openings are provided having a spacing which is the same as the data carrier width.

* * * * *